Jan. 18, 1938.  F. W. DIXON  2,105,781
CHASSIS FOR MOTOR DRIVEN VEHICLES
Filed Nov. 17, 1936  2 Sheets-Sheet 1
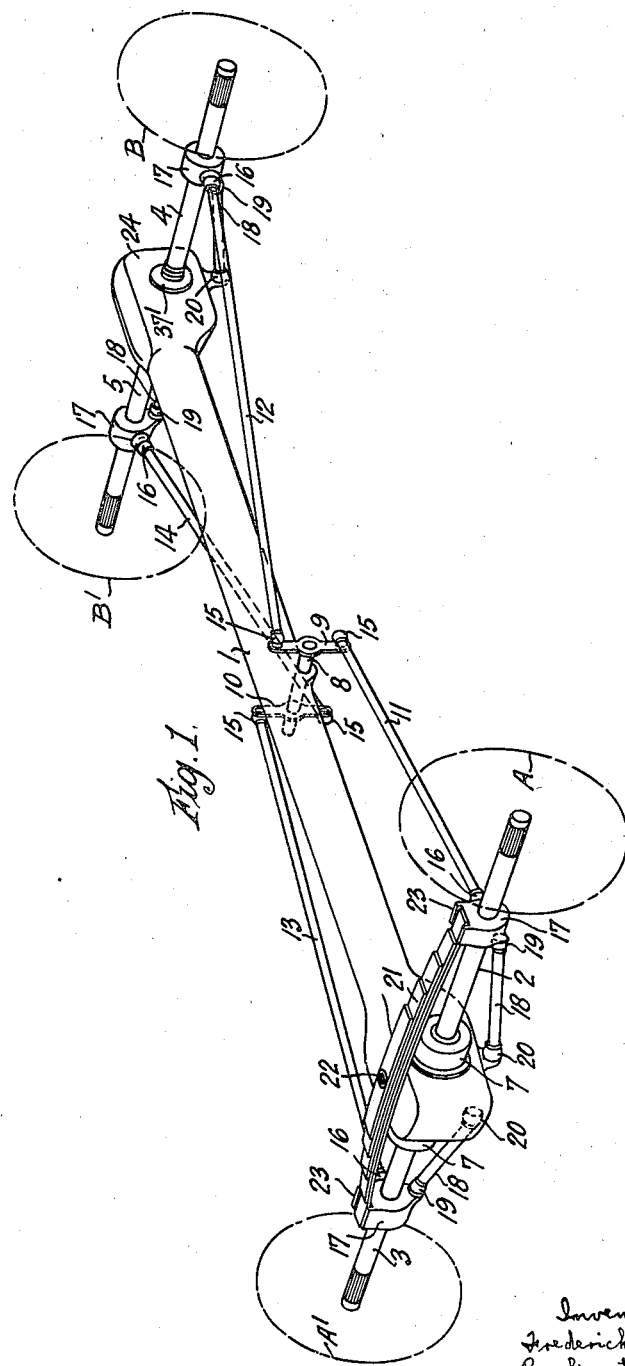

Jan. 18, 1938.　　　F. W. DIXON　　　2,105,781
CHASSIS FOR MOTOR DRIVEN VEHICLES
Filed Nov. 17, 1936　　　2 Sheets-Sheet 2
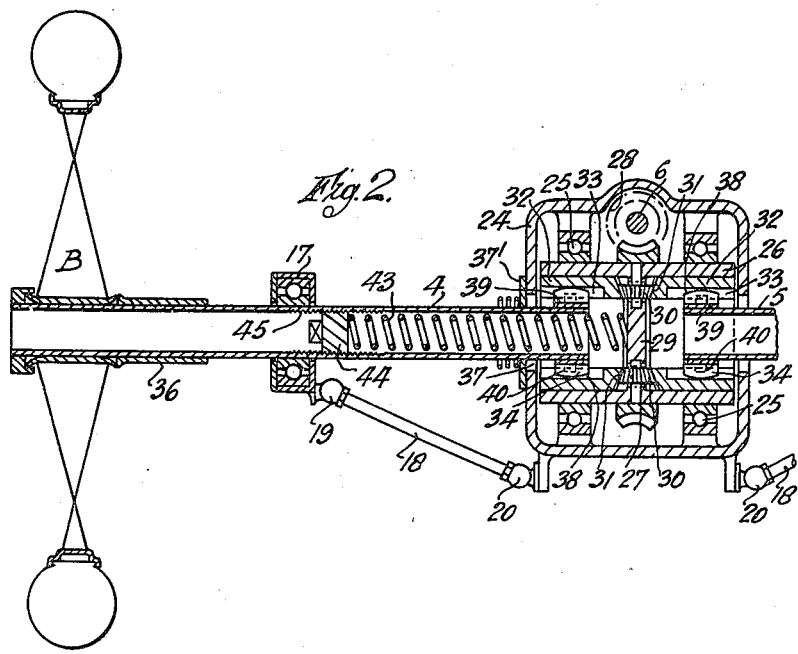

Patented Jan. 18, 1938

2,105,781

UNITED STATES PATENT OFFICE 2,105,781

CHASSIS FOR MOTOR DRIVEN VEHICLES

Frederick William Dixon, Reigate, England

Application November 17, 1936, Serial No. 111,312
In Great Britain November 18, 1935

14 Claims. (Cl. 180—49)

This invention relates to motor driven vehicles and more particularly to a chassis construction therefor.

According to this invention a motor vehicle chassis comprises a longitudinally extending central girder frame and steerable front wheels which are mounted on separate half axles universally suspended at their inner ends from the frame and interconnected with a steering mechanism so that steering is effected by swinging said half axles in opposite directions.

The chassis may consist of a simple tube or like tubular frame to which the half axles are attached by universal joints, drive to the axles being taken from a driving shaft housed preferably within the chassis tube and with or without a differential mechanism. Either a two or four wheel drive may be employed.

According to a subordinate feature of the invention both front and rear wheels are on half axles and act as steering wheels, being interconnected by a linkage system with a common steering mechanism.

Other features of the invention are concerned with springing and with means for reducing "breezing" i. e. wheel scrub.

The invention is illustrated by the accompanying drawings, in which Figure 1 is a part perspective view of a chassis constructed in accordance with the invention.

Figure 2 is a transverse sectional view of the axle driving gear and its housing for the purpose of illustrating the sliding movement of the wheel axles in relation to the chassis tube.

Referring to Figure 1 of the drawings the chassis comprises a longitudinally extending tubular girder 1, from which the front and rear wheel half axles are individually suspended, the respective wheel half axles being indicated at 2, 3, 4 and 5.

Drive to the wheel half axles may be direct from a driving shaft 6 (see Figure 2) housed within the chassis tube, each of the wheel half axles being supported from the frame by universal mountings, the covers for which are indicated at 7. The universal joints may be of any suitable known type which will allow of inward and outward movement of the half axles relative to the frame as is necessary for up and down movements due to road inequalities.

The construction lends itself either to a two or four wheel drive and furthermore since each wheel and its axle shaft constitutes an independent unit, front and back wheel steering may be employed.

In the arrangement illustrated a four wheel steering system is shown, both the front and back half axles being interconnected so that steering movement imparted say to the unit 2 is accompanied by a sympathetic movement of the corresponding unit 3. This is effected by means of a thrust rod 11 connected to a lever arm 9 fast on a rock shaft 8 carried by the chassis frame 1. On the other end of the rock shaft 8 is an oppositely moving lever arm 10 coupled through a corresponding thrust rod 13 to the other unit 3. When rear wheel steering is also employed the lever arms 9 and 10 are constructed as two armed levers and respectively connected through thrust rods 12 and 14 to the rear half axles 4 and 5. In the case where front wheel steering only is employed the rear half axles 4 and 5 may be held against movement by tie pieces fast with the frame 1 or a cross bar thereon (these parts not being shown).

Each of the thrust rods 11—14 has universal connections with the lever arms as indicated at 15 and with housings 17 (see also Figure 2) on the axle units, as indicated at 16.

Each of the housings 17 is anchored to the frame 1 by tie rods 18 also provided with universal joint attachments 19 and 20.

It will be obvious that when steering movement is transmitted to any one wheel half axle, for instance, the inside front wheel indicated at A so as to vary its angle of inclination to the longitudinal axis of the chassis, movement of the axle of wheel A for steering to the left will be caused by a rearward movement of the rod 11 and this will produce a corresponding forward movement of the rod 12, thus imparting a corresponding angular movement to the half axle of the rear wheel indicated by B.

Corresponding angular steering movements will be imparted through the spindle 8 and rods 13, 14 to the opposite wheels A', B'.

It will further be appreciated that by interconnecting the steering half axles any sudden thrust due to forces in a longitudinal direction on one wheel axle unit will be transferred to the other wheel unit or units. It will be clear that the invention is not restricted to four wheel steering and may be applied say to a six wheeled vehicle, an additional pair of wheels being attached to the chassis intermediate the front and back axles. In order to render the steering self centering a centralizing device may be provided which automatically operates to return the steering system to the normal position.

Springing of the front or rear axle units may be by means of semi-elliptical springing 21 mounted to pivot about a centre 22 on the chassis tube. Seats 23 provided on the housings 17 receive the ends of the spring and are so arranged as to permit of relative transverse and longitudinal movement therebetween, the former being due to the variation in the pivotal centres of the half axles 2 and 3 and the spring.

Numerous other advantages arise in that individual braking of the wheels may be dispensed with, so that braking of the vehicles may be effected by a single brake operating on the driving or propeller shaft within the chassis tube which arrangement will give equalized braking and make it impossible to stop the front wheels alone when braking with the result that controllability and steering is improved. Also should it be desired to employ artificial cooling, such as a water cooled system for the brake, its fitting will be considerably simplified.

The chassis of this invention, it will be appreciated, is of simple construction and may be produced at low cost. It gives independent springing of the wheels in a very simple manner and likewise enables the width of the track to be varied simply, for example, by employing telescopic or other adjustable half axles.

Also the unsprung weight of the vehicle is materially reduced as compared with existing chassis.

Referring now to Figure 2, there is shown an alternative construction and also a means of reducing what is known as "breezing", that is transverse tyre scrub between the wheel tyre and road surface. In order to reduce breezing it is necessary to maintain the point of contact of the tyre in relation to the chassis substantially constant and according to this invention in order to obtain this result the wheel half axles are capable of a limited sliding movement in relation to the chassis frame.

The differential mechanism is contained within a housing 24 forming part of the chassis tube.

Rotatably mounted by bearings 25 within the housing 24 is a casing 26 for the differential and on the periphery of which is fast a worm wheel 27 meshing with a worm 28 on the driving shaft. The casing 26 is provided with a central partition 29, which is cut away to provide openings for two bevel pinions respectively indicated at 30 and mounted to rotate about studs carried by the casing. The pinions mesh with peripheral teeth 31 formed on the inside ends of pots 32 separately mounted within the casing 26. Each pot 32, is provided with diametrically opposite grooves 33, along which are slidable blocks 34 on a tubular axle piece 4, which carries the housing 17.

The blocks 34, it will be noted, have a curved outer face 38 so as to permit of angular movements of the wheel axle 4 in the vertical plane of the grooves 33. Angular movement of the wheel in a horizontal plane is obtained by providing flats 39 on the axle piece, on which the inner faces of the blocks are seated, the flats 39 having projecting studs 40 which enter vertical bores in the blocks.

The wheel B is secured to the outer end of the axle 4 and it will be observed that provision is made for mounting a second wheel if this be desired, a removable sleeve 36 being fitted when a second wheel is not in use.

The axle piece 4 passes through an enlarged opening 37 in the side wall of the housing 24, and over which is fitted a cover plate 37' held in position by means such as a spring as shown, the opening being of sufficient size to accommodate the angular movements of the axle 4 relative to the housing.

The spring 43, which is in compression against the stop 44 which is screwed on a thread 45 on the inside of the half axle tube, resists inward movement of the wheel and, as will be obvious, acts as a road spring, since it resists upward movement of the wheel.

It will be appreciated that by providing for the wheel axles to have a limited transverse sliding movement in relation to the chassis tube, it is possible to maintain the distance between the point of contact of the tyre with the ground and its point of connection with the chassis substantially constant, since when the axle flexes in relation to the chassis, the displacement of the wheel due to the variation in its angle of inclination to the chassis, is taken up by relative movement of the wheel axles and which is made possible by the sliding of the blocks 34 in their grooves 33.

The chassis member may be constructed to incorporate the engine and gear box as an integral unit and should two engines be employed as the driving unit these may be arranged to run in opposition to each other with the result that the reaction torques on the chassis tube would counteract each other.

What I claim is:—

1. In a motor driven vehicle, the combination of a chassis including a longitudinally extending central girder frame; steerable front wheels; half axles on which said wheels are carried; universal connections, one at the inner end of each half axle for suspending it from said frame; and means for swinging said half axles simultaneously in opposite directions so as to steer the vehicle.

2. The combination as set forth in claim 1 and including further a leaf spring spanning the two half axles.

3. In a motor driven vehicle, the combination of a chassis including a longitudinally extending central girder frame; steerable front wheels; half axles on which said wheels are carried; universal connections, one at the inner end of each half axle for suspending it from said frame; rear wheels; separate half axles on which said rear wheels are carried; means for suspending said rear wheel half axles at their inner ends from said frame; and means for swinging the front half axles simultaneously in opposite directions so as to steer the vehicle.

4. The combination set forth in claim 3 and including universal connections for suspending the rear half axles from the frame; and means for simultaneously swinging all the half axles to steer the vehicle.

5. The combination set forth in claim 1, and further including means for driving the front wheels.

6. The combination as set forth in claim 3 and further including means for driving the front and rear wheels.

7. The combination set forth in claim 1 and in which the axle swinging means include a rock shaft on the girder frame, lever arms on the rock shaft, and thrust rods universally mounted each at one end to a half axle and at the other end to one of said lever arms.

8. The combination set forth in claim 3 further including means for universally suspending the rear half axles from the frame and in which means are provided for simultaneously swinging all the half axles to steer the vehicle, said axle swinging means including a rock shaft on the girder frame, lever arms on the rock shaft, and thrust rods universally connected each at one end to a half axle and at the other end to one of said lever arms.

9. The combination set forth in claim 1 in which the connections between the half axles and the frame comprise means permitting relative transverse movement between each half axle and the frame.

10. The combination set forth in claim 1 in which the connections between the half axles and the frame comprise means permitting relative transverse movement between each half axle and the frame, and springs for resisting inward movement of the half axles toward the frame.

11. The combination set forth in claim 1 in which the connections between the half axles and the frame comprise means permitting relative transverse movement between each half axle and the frame, compression helical springs mounted one inside each half axle for resisting inward movement of the half axles toward the frame.

12. The combination set forth in claim 3 in which the connections between the half axles and the frame comprise means permitting relative transverse movement between each half axle and the frame.

13. The combination set forth in claim 3 in which the connections between the half axles and the frame comprise means permitting relative transverse movement between each half axle and the frame, and springs for resisting inward movement of the half axles toward the frame.

14. The combination set forth in claim 3 in which the connections between the half axles and the frame comprise means permitting relative transverse movement between each half axle and the frame, compression helical springs mounted one inside each half axle for resisting inward movement of the half axles toward the frame.

FREDERICK WILLIAM DIXON.